United States Patent
McDonald

(10) Patent No.: US 7,596,390 B2
(45) Date of Patent: Sep. 29, 2009

(54) CELLULAR PHONE

(75) Inventor: Andrew McDonald, Osaka (JP)

(73) Assignee: Kyocera Corporation, Kyoto (JP)

( * ) Notice: Subject to any disclaimer, the term of this patent is extended or adjusted under 35 U.S.C. 154(b) by 0 days.

(21) Appl. No.: 11/078,705

(22) Filed: Mar. 14, 2005

(65) Prior Publication Data

US 2005/0215291 A1    Sep. 29, 2005

(30) Foreign Application Priority Data

Mar. 15, 2004   (JP)   ............... 2004-073152

(51) Int. Cl.
*H04B 1/38*      (2006.01)
*H04M 1/00*      (2006.01)
*H04M 9/00*      (2006.01)
*H04M 7/00*      (2006.01)
*H04N 5/238*     (2006.01)

(52) U.S. Cl. ............... 455/566; 455/556.1; 455/575.1; 379/433.04; 348/369

(58) Field of Classification Search ........... 455/566, 455/575.3, 556.1, 556.2, 557; 359/247, 249; 345/747; 379/433.04; 348/369
See application file for complete search history.

(56) References Cited

U.S. PATENT DOCUMENTS

| | | | | |
|---|---|---|---|---|
| 6,009,336 | A * | 12/1999 | Harris et al. | 455/566 |
| 6,466,202 | B1 * | 10/2002 | Suso et al. | 345/169 |
| 6,785,562 | B2 * | 8/2004 | Lee et al. | 455/566 |
| 6,801,796 | B2 * | 10/2004 | Finke-Anlauff | 455/575.3 |
| 7,085,590 | B2 * | 8/2006 | Kennedy et al. | 455/556.1 |
| 2002/0037753 | A1 * | 3/2002 | Shitahaku | 455/566 |
| 2003/0203747 | A1 * | 10/2003 | Nagamine | 455/575.3 |
| 2004/0085353 | A1 * | 5/2004 | Kawakami et al. | 345/747 |
| 2005/0020325 | A1 * | 1/2005 | Enger et al. | 455/575.3 |

FOREIGN PATENT DOCUMENTS

| | | |
|---|---|---|
| JP | 05-108055 | 4/1993 |
| JP | H07-146461 A | 6/1995 |
| JP | 09-105958 | 4/1997 |
| JP | 3058477 | 3/1999 |
| JP | 2000-307768 | 11/2000 |
| JP | 2001-147673 A | 5/2001 |
| JP | 2003-134188 A | 5/2003 |
| JP | 2003-255307 | 9/2003 |
| JP | 2003-255307 A | 9/2003 |
| JP | 2004-62094 A | 2/2004 |

OTHER PUBLICATIONS

Office Action of Corresponding Japanese Patent Application No. 2004-073152 dated Nov. 30, 2006.

* cited by examiner

*Primary Examiner*—George Eng
*Assistant Examiner*—Un C Cho
(74) *Attorney, Agent, or Firm*—Morrison & Foerster LLP

(57) ABSTRACT

The present invention provides a cellular phone which includes a function for changing the viewing angle of the display section according to the specified executing function, when the cellular phone receives a user's operation to specify the executable function through the operating section 115. The storage section 120 stores the viewing angle information table which associates the cellular phone's function with viewing angle information. The designation to specify the executing function is received from the user through the operating section 115. The viewing angle change control section 10 reads out the viewing angle information corresponding to the specified function from the table, and executes the process of changing viewing angle according to the present viewing angle information in the viewing angle information storage section 1.

8 Claims, 8 Drawing Sheets

| Function | Viewing Angle |
|---|---|
| All Mail Funcition | NARROW |
| Edit Mail | NARROW |
| Display Mail | NARROW |
| All Address Book Function | WIDE |
| Display Address Book | NARROW |
| Call | WIDE |
| All Camera Function | WIDE |
| Display Image | — |
| ⋮ | ⋮ |

(a)

(b)

(c)

(d)

(a)

(b)

CELLULAR PHONE

CROSS REFERENCE TO RELATED APPLICATIONS

This application is based upon and claims priority of Japanese Patent Application No. 2004-073152, the contents of which are incorporated herein by reference.

BACKGROUND OF THE INVENTION

1. Field of the Invention

The present invention relates to a display device, such as a liquid crystal display device for a cellular phone, especially, a device having a function of altering a viewing angle of a liquid crystal display.

2. Description of the Related Art

A liquid crystal display having a wide viewing angle (hereafter called "wide viewing angle display") is installed to a cellular phone. It is the mainstream device that has added the functions of E-mail, camera, and television as well as the function of a telephone call. The wide viewing angle display device is preferable to display images, such as picture image or television show image on the cell phone display, since two or more people can see the images at the same time.

However, in the case that a user use the E-mail function of the cellular phone in a public place, it appears an undesirable situation that the image or information which he/she doesn't want to be seen by other people is displayed on the wide viewing angle display. To solve this kind of problem, there is a solution that the viewing angle is made narrow by putting a sheet on the display to limit the viewing angle of the display (for example, Japanese Registered Utility Model No. 3058477). According to this technology, peeping can be prevented even if the wide viewing angle display device displays a private image or information. On the other hand, there is still a problem that the viewing angle is fixed.

Further, it is disclosed in, for example, the Japanese laid open patent TOKKAI-HEI 9-105958 that a display device which viewing angle is electrically changed from wide to narrow (hereafter called "narrow viewing angle"). In accordance with the method, it is easily achieved to change viewing angle of display from wide to narrow, and vise/versa. Such display device can be installed into the cellular phone apparatus. In that case, there may be a push button for the viewing angle change in the cellular phone, then, a user can select a preferable viewing angle by operating of the pushbutton. It, however, spends the user's time and effort to select the viewing angle manually in accordance with a displayed image on cellular phone. In addition users may forget such selection.

SUMMARY OF THE INVENTION

In view of the foregoing circumstances, an object of the present invention is to provide a method for a wide viewing display which can surely switch the viewing angles of the display without any user's switch operations.

To solve such problems described above, the preferred embodiment of the invention of a cellular phone comprises followings: a display device with variable viewing angle, a function designate means for designating a certain function of the cellular phone, a viewing angle change means for changing the viewing angle of the display device in accordance with the designated function.

In accordance with the preferred embodiment of the invention, it is not necessary for a user to select viewing angle manually in accordance with a selected function.

Further, the cellular phone also comprises a change designation receive means for receiving the designation of the viewing angle change in the viewing angle change means, then, in the case of receiving the order of the viewing angle change from the change designation receive means, the viewing angle of the display device may be changed. In accordance with the preferred embodiment, even though the viewing angle is changed automatically, a user can change the viewing angle depending on the situation manually.

In these configurations, another preferred embodiment of the present invention provides a cellular phone further including a display means for displaying a status of the viewing angle of the display device. In the configuration described above, a user can easily recognize the status of the viewing angle, and then he can easily judge what viewing angle should be set.

In these configurations, another preferred embodiment of the present invention provides a cellular phone further including a store means for storing viewing angle information being respectively associated with the functions which the cellular phone has; and a update means for updating the viewing angle information in the store means, and the update means changes the viewing angle according to the updated viewing angle information. In the configuration described above, a user can originally set the viewing angle in each executing function, because a user can update the viewing angle information. The frequency of the user manually changing the viewing angle can be reduced.

In these configurations, another preferred embodiment of the present invention provides a cellular phone further including a illuminate means for illuminating the display side of the display device by a backlight; and a control means for controlling the brightness of the backlight in the illuminate means according to the viewing angle changed by the viewing angle change means. In the configuration described above, it is prevented that the brightness of the display is decreased when the viewing angle of the display is narrow. Therefore, the display device displays the same level of brightness in both a narrow viewing angle and a wide viewing angle.

In these configurations, another preferred embodiment of the present invention provides a cellular phone further including a clock means for indicating present time; and a viewing angle change limitation means for limiting the execution of the viewing angle change means according to the present time which is indicated by the clock means. In the configuration described above, power consumption for the process of changing the viewing angle automatically (hereafter called "the auto viewing angle change process") can be reduced because the auto viewing angle change process can temporarily be suspended when a user wants the display device to display with a normal viewing angle, for example, when a user is at home at night.

In these configurations, another preferred embodiment of the present invention provides a cellular phone further including a function of displaying an image in either of the two directions of the display which are orthogonal on the display side of the display device, and the viewing angle change means changes the viewing angle according to the direction of the image displaying. In the configuration described above, the viewing angle can be changed, when a user switch the image from a length display to a horizontal display, for example, because in the case of a portrait display, the image of television show may be watched with the display oblong.

In these configurations, another preferred embodiment of the present invention provides a cellular phone of which a user can change the viewing angle in a specific direction of the display device, further including a narrow viewing angle direction receive means for receiving a designation of changing the viewing angle in a specific direction in the change designation receive means, and the viewing angle change means changes the viewing angle of the display device in the direction which are received by the narrow viewing angle direction receive means. In the configuration described above, for example, when a user wants to show the image to the person who is in the user's right hand direction, the viewing angle only in the user's left hand direction is narrow.

The software of the present invention, executable in a computer having a CPU and memories, comprises a specifying function step for accepting specification of the function which the cellular phone has; and a viewing angle change step for changing the viewing angle of the display device according to specification by the specifying function step. As a result, the auto viewing angle change process which has the effect mentioned above on the cellular phone can be done by executing the program on the cellular phone.

BRIEF DESCRIPTION OF THE DRAWING

The above and other objects and advantages of the present invention will become apparent and more readily appreciated from the following description of the preferred embodiments taken in conjunction with the accompanying drawings, of which.

DETAILED DESCRIPTION OF THE PREFERRED EMBODIMENTS

Figure 1:
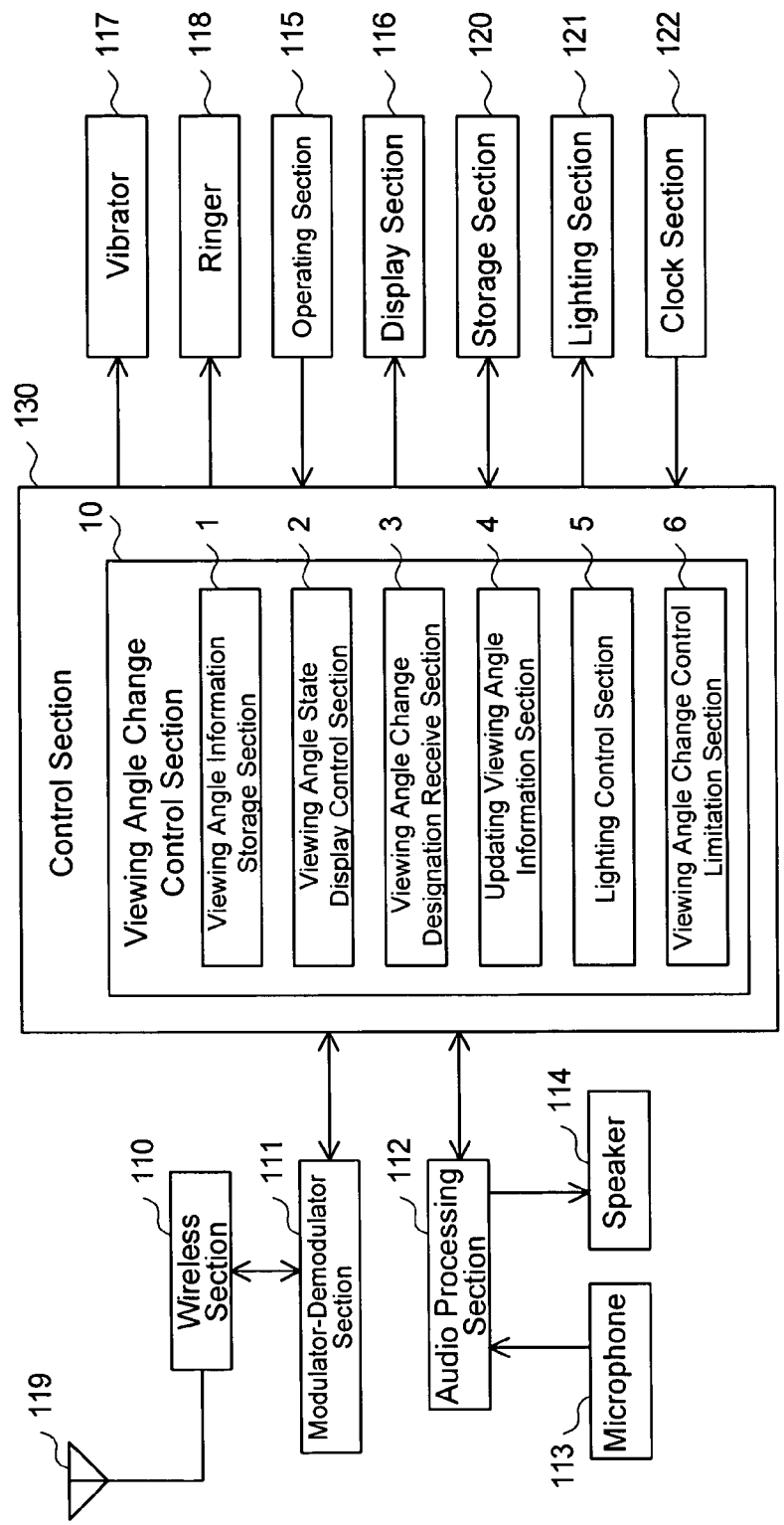
FIG. 1 is a function block diagram of a cellular phone which is preferably used in accordance with embodiments of the present invention.

Reference will now be made in detail to the preferred embodiments of the present invention, examples of which are illustrated in the accompanying drawings, wherein like reference numerals refer to like elements throughout.

Embodiments of the present invention will now be described below with reference to FIGS. 1 to 8.

<External Appearance>

Figure 2:
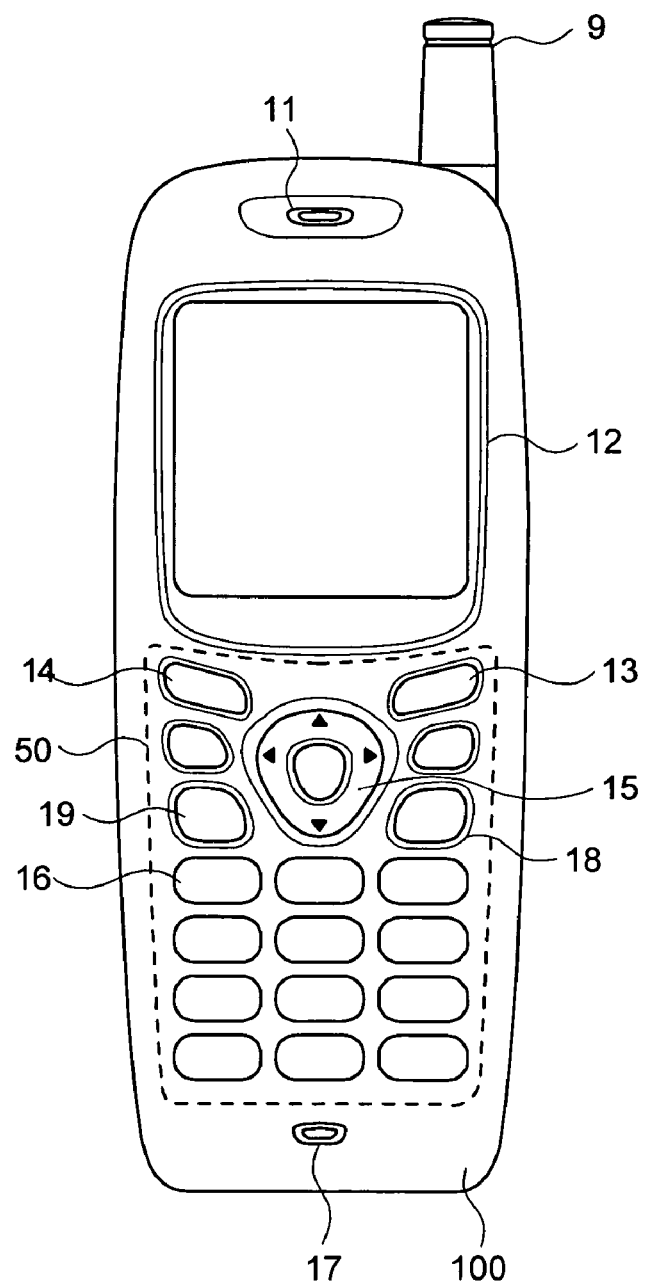
FIG. 2 illustrates a front view of an external appearance of cellular phone which is preferably used in accordance with embodiments of the present invention.

FIG. 2 illustrates a front view which shows an external appearance of cellular phone 100. The arrangement of antenna 9, speaker 11, display 12, viewing angle change key 13, power supply key 14, cursor key 15, ten key 16, off hook key 18, and on hook keys 19 is illustrated in FIG. 2. Cursor key 15 detects distinctively user operation done to an upper, lower, right, left and central part.

<Function>

FIG. 1 is a function block diagram of a cellular phone 100. Hereafter, the function of the cellular phone 100 is explained while referring to FIG. 1.

The cellular phone 100 has a wireless section 110, a modulator-demodulator section 111, a audio processing section 112, a microphone 113, a speaker 114, an operating section 115, a display section 116, a vibrator 117, a ringer 118, an antenna 119, a storage section 120, a lighting section 121, a clock section 122 and control section 130. The wireless section 110 amplifies a received signal received by the antenna 119, and a modulator-demodulator section 111 demodulates the amplified received signal into a received audio signal and a received data signal. The audio processing section 112 digital-analog converts the received audio signal then outputs from speaker 114. The control section 130 does a predetermined operation, such as e-mail operation, in accordance with the received data.

The audio processing part 112 A-D converts a telephone audio signal from the microphone 113. The modulator-demodulator section 111 modulates the telephone audio signal which is A-D converted and a transmission data signal which is given from the control section 130 into a transmission signal. The wireless section 110 amplifies the transmission signal and transmits it from the antenna 119. The configuration itself that realize the transmission of the audio and data signal is not a specific part of the present invention, therefore the explanation in detail will be omitted. General configuration for such function, which is used generally, will be used.

The display section 116, for instance, is a color liquid crystal panel. In the Japanese Unexamined Patent Publication (Kokai) No. 9-105958, the technology is disclosed for controlling the viewing of a liquid crystal element angle (a Control LCD) and a liquid crystal element for displaying image (a Display LCD) is arranged between two deflecting plates. When a certain voltage is provided to the Control LCD, the view angle of the Display LCD is widened. On the other hand, without such voltage to the Control LCD, the view angle of the Display LCD is narrowed.

The viewing angle change process in the present invention is achieved by the technology which is disclosed in TOKKAI-HEI 09-105958. It, however, is not limited to this and other technology that is able to change the viewing angle of display device can be used.

The display section 116 receives an image display signal and the viewing angle change signal. The image display signal is relating to each executed function of the cellular phone in accordance with the control section 130. The viewing angle change signal is from the viewing angle change control section 10, and designate whether a wide viewing angle or a narrow viewing angle is selected. In accordance with the viewing angle change signal, the display section 116 displays image for executed function with selected view angle. The configuration and function of the display device are disclosed in TOKKAI-HEI 09-105958, so the detail description will be omitted.

Figure 3:
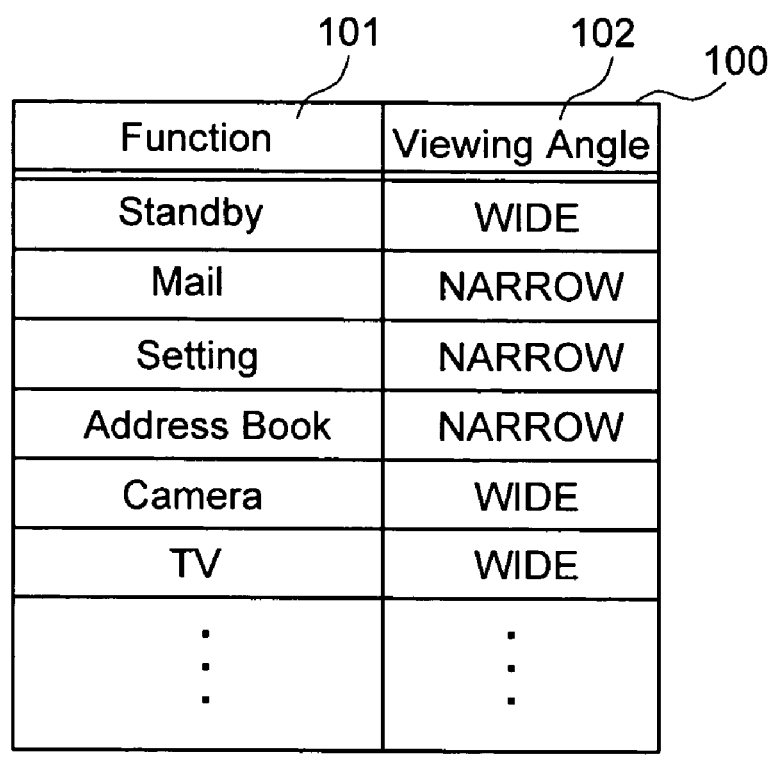
FIG. 3 is a table showing a viewing angle information of the auto viewing angle change process.

The storage section 120 memorizes each executed function in the cellular phone 100 and viewing angle information correspondingly. The viewing angle information is memorized as shown in FIG. 3. The viewing angle information 102 is memorized in connection with the executed function 101. In FIG. 3, "WIDE" is corresponding to the wide viewing angle and "NARROW" is corresponding to the narrow viewing angle.

The lighting section 121 is achieved by using a white LED (light emitting diode) etc., and illuminates the display section 116 according to the designation of a lighting control section 5. The clock section 122 has the function to inform of the present time. The control section 130 comprises a CPU and memories (ROM, RAM), and its function is to control each section in the cellular phone 100 according to the user's operation through the operating section 115. The control section 130 controls all of the operations of the cellular phone 100 by the CPU's executing a program in the ROM.

ROM holds the program for achieving the viewing angle change operation to change the viewing angle according to the executing function, that is to say, the most featured operation of the present invention. RAM temporarily stores the work data for the CPU to execute the program. The control section 130 comprises a viewing angle information storage section 1, a viewing angle change control section 10, a viewing angle state display control section 2, and the lighting control section 5.

The viewing angle information storage section 1 memorizes a temporary viewing angle information showing the state of a present viewing angle in the display section 116. The temporary viewing angle information is read out by the viewing angle change control section 10, when the viewing angle change process is done. The viewing angle change control section 10 receives the designation of the executing functions of the user's choice through the operating section 115. Then, the viewing angle change control section 10 reads out the viewing angle information corresponding to the executing function from the storage section 120 and also reads out the temporary viewing angle information from the viewing angle information storage section 1. Then, the viewing angle change control section 10 sends out the signal which shows whether the voltage for controlling the viewing angle is impressed, or not, according to the viewing angle information and the temporary viewing angle information.

Figure 5:
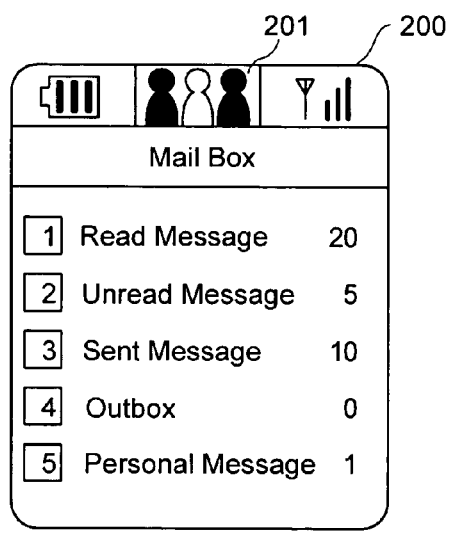
FIG. 5 is an illustration showing the viewing angle image and showing that the display of the cellular phone is displaying the image.
Figure 5:
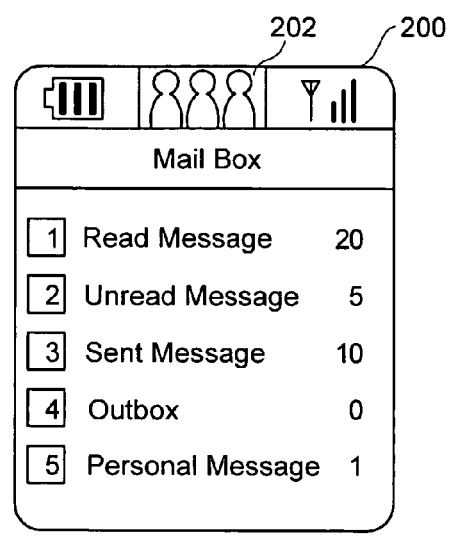
Figure 5:
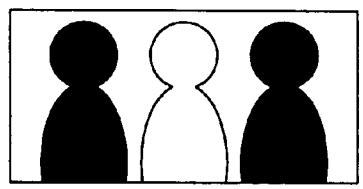
Figure 5:
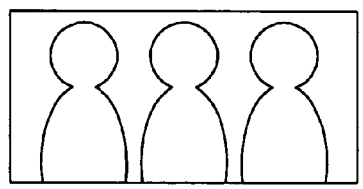

The viewing angle state display control section 2 comprises the function to show the state of a present viewing angle of the display section 116. In an embodiment of the present invention, the image of the temporary viewing angle information (Hereafter called a "viewing angle image") is displayed on the display section 116. FIG. 5(*c*) is a figure where the viewing angle image is illustrated. When the temporary viewing angle information is a narrow viewing angle, the figure of FIG. 5(*c*) is displayed like shown in FIG. 5(*a*) 201. When the temporary viewing angle information is a wide viewing angle, the figure of FIG. 5(*d*) is displayed like shown in FIG. 5(*b*) 202.

The viewing angle state display control section 2 reads out the temporary viewing angle information from the viewing angle information storage section 1, and then, provides the signal for displaying the viewing angle image to the display section 116. The lighting control section 5 outputs the signal to the lighting section 121 to control the backlight to be brighter when the viewing angle of the display section 116 is narrow than when it is wide.

<Operation>

Figure 4:
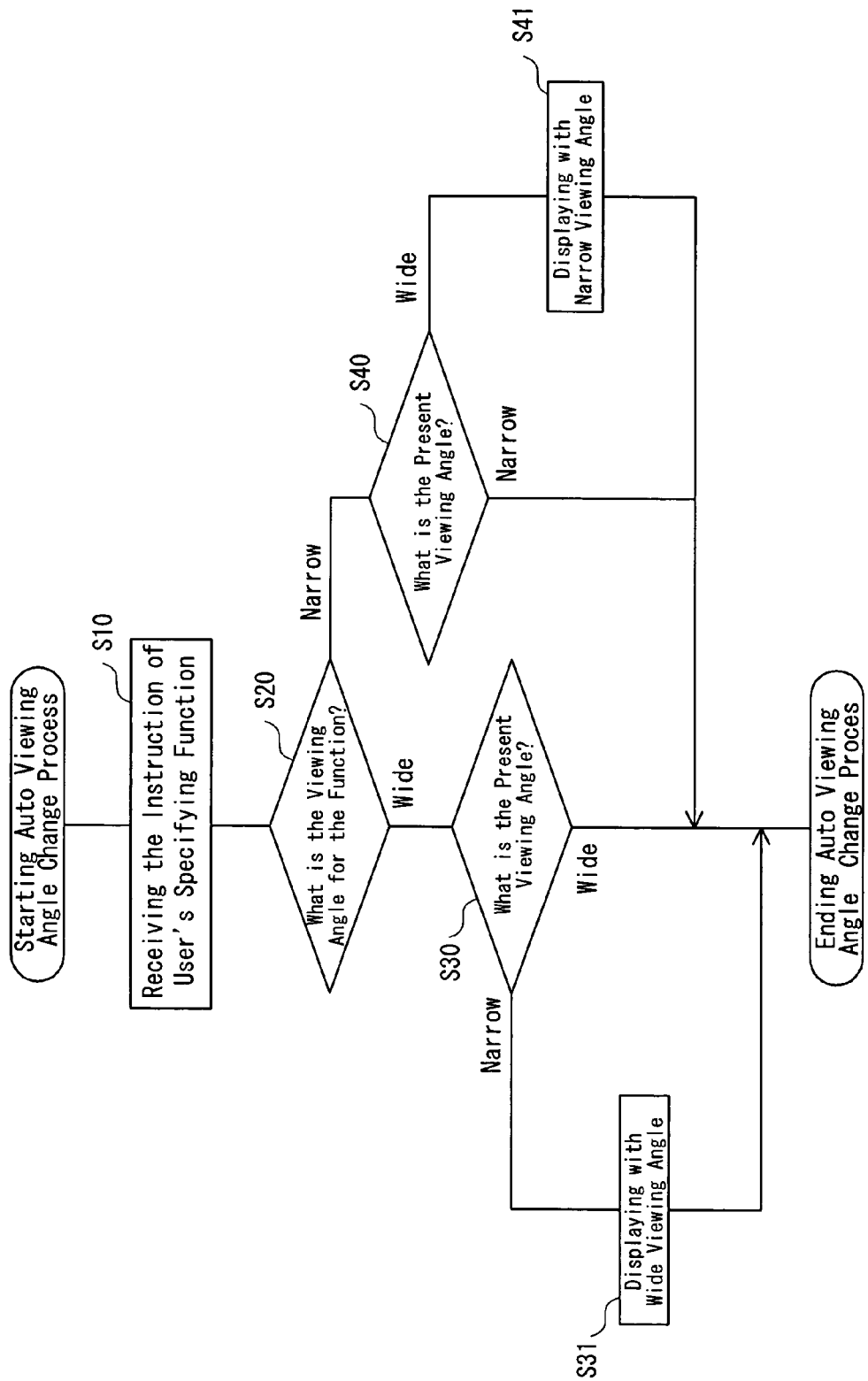
FIG. 4 is a flow chart that shows operation while the auto viewing angle change process has been executed.

FIG. 4 is a flow chart showing an operation where the cellular phone 100 changes the viewing angle according to a user's specified operation of the executing function (Hereafter called "auto viewing angle change process").

In the situation where the display section 116 displays an image with either a narrow viewing angle or a wide viewing angle, after the viewing angle change control section 10 receives the designation of the specified executing function from the user through the operating section 115 (Step S10), the viewing angle change control section 10 reads out the viewing angle information corresponding to the specified executing function from the storage section 120, and judges the viewing angle information of the specified executing function (Step S20) In Step S20, if the viewing angle change control section 10 judges that the viewing angle information on the executing function is a narrow viewing angle, the viewing angle change control section 10 reads out the temporary viewing angle information on the display section 116, and judges whether the temporary viewing angle information is a narrow viewing angle or a wide viewing angle (Step S40).

In Step S40, if the viewing angle change control section 10 judges that the temporary viewing angle information is a narrow viewing angle, the viewing angle change control section 10 does not send out a signal to instruct changing the viewing angle to the display section 116, and the display section 116 keeps displaying the narrow viewing angle. In addition, if the viewing angle change control section 10 judges that the temporary viewing angle information is a wide viewing angle, the viewing angle change control section 10 sends out a signal to instruct the display section to display with a narrow viewing angle (Hereafter called "narrow viewing angle signal") to the display section 116, and the display section 116, which has received the signal, displays the narrow viewing angle in Step S40.

In Step S20, if the viewing angle change control section 10 judges that the viewing angle information on the executing function is a wide viewing angle, the viewing angle change control section 10 reads out the temporary viewing angle information from the viewing angle information storage section 1, and judges whether the temporary viewing angle information is a narrow viewing angle or a wide viewing angle (Step S30).

In Step S30, if the viewing angle change control section 10 judges that the temporary viewing angle information is a narrow viewing angle, the viewing angle change control section 10 sends out a signal to instruct the display section to display with a wide viewing angle (Hereafter called "wide viewing angle signal") to the display section 116, and the display section 116 displays with the wide viewing angle (Step S31). In addition, if the viewing angle change control section 10 judges that the temporary viewing angle information is a wide viewing angle, the viewing angle change control section 10 does not send out a signal to instruct about changing the viewing angle to the display section 116, and the display section 116 keeps displaying the wide viewing angle.

<Manual Operation Viewing Angle Change Process>

Hereafter, the process of changing a present viewing angle of display section 116 according to receiving a user's operation to change viewing angles is explained, when an image is displayed with a viewing angle done by the auto viewing angle change process which is mentioned above (Hereafter called "manual operation viewing angle change process").

The manual operation viewing angle change process is done by the control of viewing angle change designation receive section 3 and the viewing angle change control section 10 in FIG. 1. The viewing angle change designation receive section 3 receives the user's operation of pushing the viewing angle change key 13, and sends out a signal to instruct changing viewing angles to the viewing angle change control section 10. If the viewing angle change control section 10 receives the signal from the viewing angle change designation receive section 3, the viewing angle change control section 10 reads out a temporary viewing angle information from the viewing angle information storage section 1, and sends out a signal which shows either a narrow viewing angle or a wide viewing angle according to the temporary viewing angle information.

<Operation>

Figure 6:
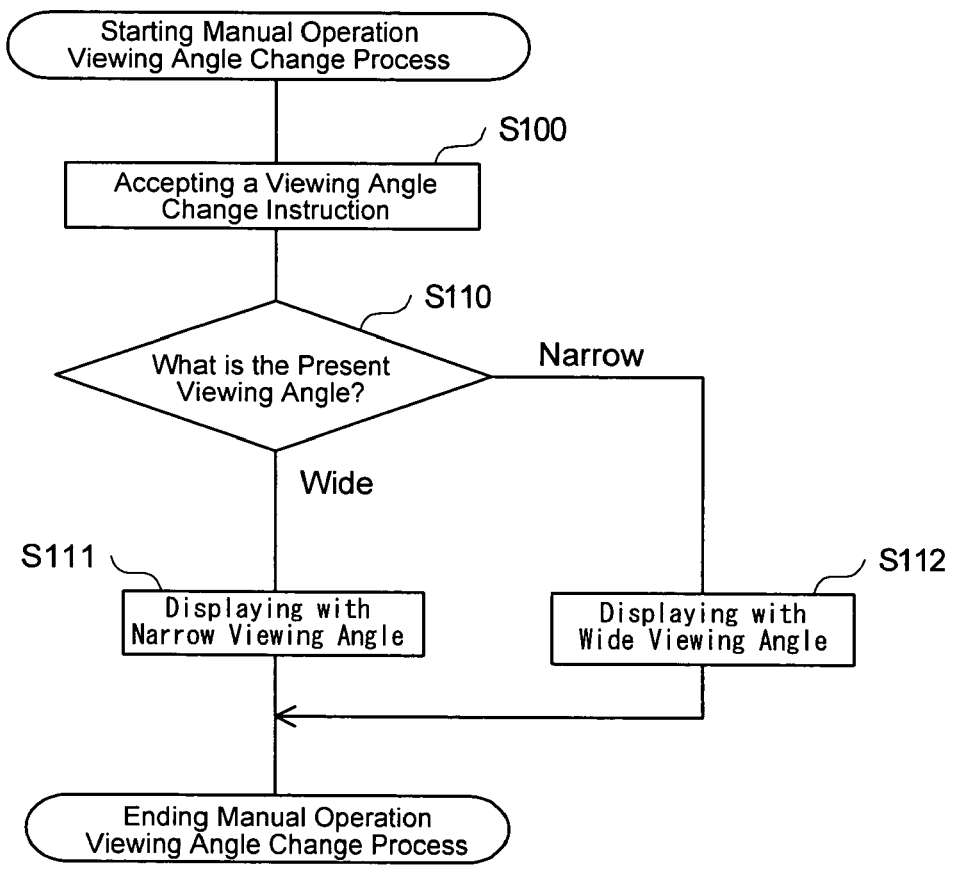
FIG. 6 is a flow chart that shows operation while the manual operation viewing angle change process has been executed.

FIG. 6 is a flow chart that shows operation where the manual operation viewing angle change process is done with the cellular phone 100. If the viewing angle change designation receive section 3 receives the user's operation of pushing the viewing angle change key 13 while the display section 116 is displaying with a narrow viewing angle or a wide viewing angle, the viewing angle change designation receive section 3 sends out a signal to instruct changing viewing angles to the viewing angle change control section 10 (Step S100).

The viewing angle change control section 10, which receives the signal to instruct changing viewing angles by Step S100, reads out a temporary viewing angle information from the viewing angle information storage section 1, and then judges whether a present viewing angle is a narrow viewing angle or a wide viewing angle (Step S110).

In Step S110, if the viewing angle change control section 10 judges that the temporary viewing angle information is a wide viewing angle, the viewing angle change control section 10 sends out a narrow viewing angle signal to the display section 116. The display section 116, which has received the signal, displays the narrow viewing angle (Step Sill). On the other hand, if the viewing angle change control section 10 judges that the temporary viewing angle information is a narrow viewing angle in Step S110, the viewing angle change control section 10 sends out a wide viewing angle signal to the display section 116. The display section 116, which has received the signal, displays the wide viewing angle (Step S112).

<Updating Viewing Angle Information>

Hereafter, the process of updating the viewing angle information which corresponds to each executing function and is stored in the storage section 120 beforehand is explained.

Figure 7:
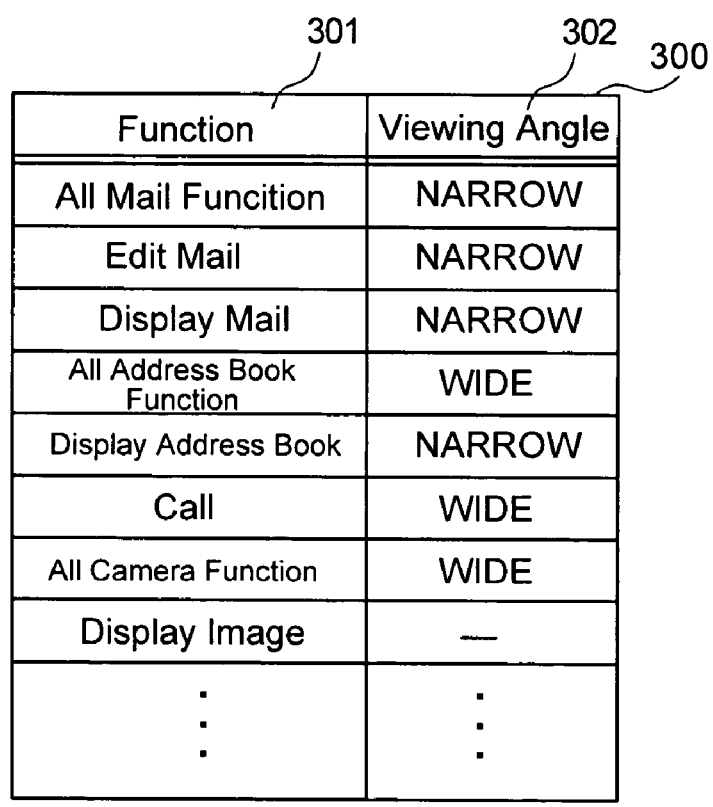
FIG. 7 is an illustration of the viewing angle information table which is preferably used in accordance with updating viewing angle information.

Although the viewing angle of each executing function in the storage section 120 is fixed in the embodiment of the present invention mentioned above, the viewing angle can be updated. FIG. 7 is an illustration of the viewing angle information table. It shows that the main function and sub-function of each executing function is associated with viewing angle information. For example, "mail function" is a main function, and "editing mail" is a sub-function.

In FIG. 3 mentioned above which shows viewing angle information table, only the main functions are set, so all images in one executing function are displayed with same viewing angle. On the other hand, the viewing angle information table in FIG. 7 has viewing angle information of both main and sub-executing functions. If viewing angle information of sub-executing function is set, an image for the sub-executing function is displayed with the viewing angle which is set for the sub-executing function. If the viewing angle information of a main executing function is different from the one of a sub-executing function, an image for a sub-executing function is displayed with the viewing angle set for the sub-executing function.

The updating viewing angle information section 4 (FIG. 1) updates the viewing angle information of the viewing angle information table in the storage section 120 to achieve the updating viewing angle information process. In the preferred embodiment, the data in the viewing angle information table (FIG. 7) is displayed on the display section 116, and the updating viewing angle information section 4 updates the viewing angle of the viewing angle information table according to a user's operation on the operating section 115.

In another preferred embodiment, when the updating viewing angle information section 4 receives the end operation executing function from a user through the operating section 115, if the viewing angle information just before the executing function's ending is different from the viewing angle information of the executing function in the viewing angle information table, the viewing angle information of the executing function in the table will be changed into the same as the viewing angle information just before its ending. It explains the case where an image concerning the telephone transmission function in FIG. 7 is being displayed with a wide viewing angle controlled by the viewing angle change control section 10, for example.

When the display section 116 displays an image concerning the telephone transmission function with the wide viewing angle, the viewing angle change designation receive section 3, which receives a user's operation of pushing the viewing angle change key 13, sends out a narrow viewing angle signal, and the display section 116 displays the image with the narrow viewing angle. If the viewing angle change control section 10 receives the ending operation of the telephone transmission function from a user and sends out a signal meaning the function ending to the updating viewing angle information section 4, the updating viewing angle information section 4 reads out a temporary viewing angle information from the viewing angle information storage section 1, and change the viewing angle information of the telephone transmission function into a narrow viewing angle.

When the control section 130 executes the telephone transmission function according to a user's operation again, the display section 116 displays an image of the function with the narrow viewing angle.

<Limitation of the Auto Viewing Angle Change Process>

Hereafter, the process of limiting executing the auto viewing angle change process according to a period of time is explained. In the embodiment explained above, the auto viewing angle change process is executed without concerning for a period of time. On the other hand, in a preferred embodiment which is explained below, the auto viewing angle change process is executed according to a period of time.

Figure 8:
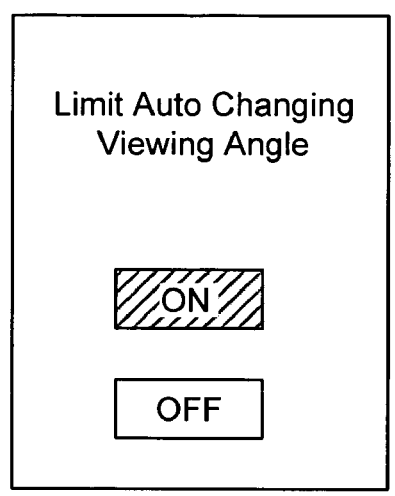
FIG. 8 is an illustration showing that the auto viewing angle change process is limited and showing the image to accept the input limitation times.
Figure 8:
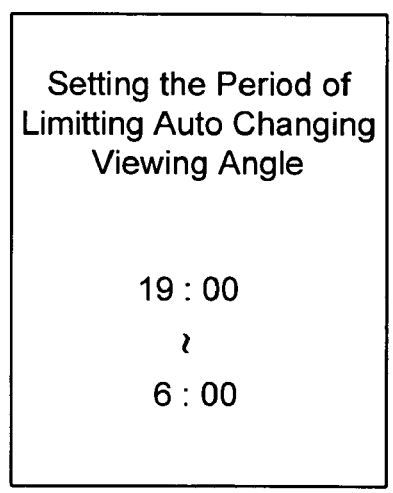

FIG. 8 is an illustration of the case that the auto viewing angle change process is limited. FIG. 8(a) is an illustration of the image for accepting a user's designation to limit the auto viewing angle change process or not to limit it through the operating section 115. "ON" means that the auto viewing angle change process is limited, and "OFF" means that the auto viewing angle change process is not limited. FIG. 8(a) is showing when a designation "ON" is accepted.

FIG. 8(b) is an illustration of the case of accepting input of a limitation start time and a limitation finish time of the auto viewing angle change process if the designation to limit the auto viewing angle change process has been accepted. In the case of FIG. 8(b), a period from "19:00" for a limitation start time to "6:00" for a limitation finish time is specified.

Hereafter, the process of the auto viewing angle change process limitation is explained, referring to FIG. 8 for example. A viewing angle change control limitation section 6 reads out a signal which indicates 19:00 and 6:00 if it receives the specification of a limitation start time "19:00" and a limitation finish time "6:00" from a user through the operating section 115. When the clock section 122 becomes 19:00 or 6:00, it sends out a signal which indicates one of these times to the viewing angle change control limitation section 6.

If the viewing angle change control limitation section 6 receives a signal which indicates 19:00 from the clock section 122, it sends out a signal to stop the auto viewing angle change process to the viewing angle change control section 10. The viewing angle change control section 10 then stops the auto viewing angle change process, then. If the viewing angle change control limitation section 6 receives a signal which indicates 6:00 from the clock section 122, it sends out a signal to start the auto viewing angle change process to the viewing angle change control section 10. The viewing angle change control section 10 then starts the auto viewing angle change process.

In the period of limiting the auto viewing angle change process, the viewing angle change designation receive 3 receives a user's operation of pushing the viewing angle change key 13, and the viewing angle change control section 10 executes the manual operation viewing angle change process.

<Changing Viewing Angle According to the Upright Direction>

In the case that the display section of the cellular phone 100 is a rectangular portrait monitor, the display section switches a horizontal direction display to display an image in a length display and a vertical direction display to display an image in a horizontal display. Hereafter, the process of changing viewing angle according to the direction of image displaying is explained.

The technology that an image is generated according to the display direction and is displayed is disclosed in the Japanese laid open patent TOKKAI-HEI 05-108055, the Japanese laid open patent TOKKAI 2000-307768. In the embodiment of the present invention, a technology to switch the display direction for displaying an image upright is achieved by these technologies mentioned above.

As a technology to change viewing angle, a technology is disclosed in the Japanese laid open patent TOKKAI 2003-255307. There is viewing angle dependency on either length sides or width sides of a monitor. Viewing angle of length sides or width sides is narrow normally, but the viewing angle becomes wide as a result of enlarging the viewing angle attribute of length sides or width sides.

In the embodiment of the present invention, a display device is achieved by the technology mentioned above. The explanation of the composition and the function of a liquid crystal display device in the embodiment of the present invention are omitted because it is disclosed in the Japanese laid open patent TOKKAI 2003-255307.

The display direction of an image in an executing function is memorized in a memory associating each executing function with display direction. If the viewing angle change control section 10 receives a user's operation to specify an executing function through the operating section 115, it reads out the display direction in the executing function from the memory and the viewing angle information of the executing function in the storage section 120, and it sends out a signal to change the viewing angle according to the display direction and the viewing angle information to the display section 116.

For example, in the case of displaying a image in a executing function as a portrait direction, the viewing angle change control section 10 sends out a signal to change viewing angle attribute of width sides to the display section 116.

<Specifying a Side to Become Narrow Viewing Angle>

Hereafter, the process of changing the viewing angle of the specified side is explained. The technology to enlarge the viewing angle of the specified side is also disclosed in the Japanese laid open patent TOKKAI 2003-255307. The technology is used in the preferred embodiment of the present invention.

The viewing angle to a display's frontage of the display device in the Japanese laid open patent TOKKAI 2003-255307 becomes bilaterally asymmetric, because the viewing angle is controlled as the angle of the right hand is the optimum view direction which shows the best angle of viewing angle attribute, when the view direction is moved from the frontage of the display to the right, for example. As a result, the viewing angle of the right hand direction becomes wide and the viewing angle of the left hand becomes narrow, in the case that the angle of the right hand direction is the optimum view direction.

In the preferred embodiment of the present invention, as a liquid crystal display device, a memory associates optimum view directions on both side of the display, an opposite side of the optimum view direction and the direction where the viewing angle becomes narrow (Hereafter called "narrow viewing angle direction"), and a value of voltage to enlarge the viewing angle attribute on each optimum view direction, and memorizes them in advance.

If the viewing angle change designation receive section 3 receives a specification of a narrow viewing angle direction by a user's operation of pushing the viewing angle change key 13 while the display section is displaying an image, it sends out a signal to indicate the narrow viewing angle direction to the viewing angle change control section 10. The viewing angle change control section 10 reads out a value of voltage of the optimum view direction against the narrow viewing angle direction from the memory, and sends out a signal to indicate the value of voltage to the display section 116.

<Complement>

It explained the embodiment above as the present invention, but the present invention is not limited to the embodiment. In addition, the present invention includes the case below as the preferred embodiments.

(1) The display device to change the viewing angle is not only the display device used in the embodiment but also the display device whose viewing angle can be changed by other technologies.

(2) As the means for displaying the state of the viewing angle, for example, the cellular phone 100 would have an illuminator like an LED, and the state of the viewing angle could be shown by illuminating when the viewing angle is either a wide viewing angle or a narrow viewing angle, in spite of displaying the viewing angle image on the display section 116 in the embodiment above.

Although a few preferred embodiments of the present invention have been shown and described, it will be appreciated by those skilled in the art that changes may be made in these embodiments without departing from the principals and spirit of the invention, the scope of which is defined in the appended claims and their equivalents.

What is claimed is:

1. A cellular phone comprising a display device with a changeable viewing angle, the cellular phone comprising:
    a specifying function section configured to accept specifications of one or more functions executable by the cellular phone;
    a viewing angle change control section configured to change the viewing angle of the display device according to a specified function;
    a storage section configured to store viewing angle information being associated with the functions which the cellular phone has; and
    an update section configured to update the viewing angle information in the storage section,
    wherein the viewing angle change control section is further configured to change the viewing angle according to the updated viewing angle information, and wherein at least one of the one or more functions comprises a main function and a sub-function and the storage section stores the viewing angle information associated with the main function and the sub-function, and wherein when the sub-function is executed, the viewing angle change control section is configured to determine if the viewing angle information of the sub-function is set in the storage section, and if only the viewing angle information of the main function is set, display all images in the executed sub-function with the same viewing angle set for the main function, and if the viewing angle information of the sub-function is set, display an image for the sub-function with the viewing angle which is set for the sub-function.

2. The cellular phone according to claim 1, wherein the viewing angle change control section comprises:

a change designation receive section configured to receive a designation to change the viewing angle, wherein the viewing angle is changed in the case that the change designation receive section receives the designation to change the viewing angle.

3. The cellular phone according to claim 2, wherein the cellular phone can change the viewing angle in a specific direction of the display device, and the cellular phone further comprises:

a narrow viewing angle direction receive section configured to receive a designation of changing the viewing angle in a specific direction in the change designation receive section, and wherein the viewing angle change control section is configured to change the viewing angle of the display device in the direction which is received by the narrow viewing angle direction receive section.

4. The cellular phone according to claim 1, further comprising:

a display section configured to display a status of the viewing angle of the display device.

5. The cellular phone according to claim 1, further comprising:

an illumination section configured to illuminate a display side of the display device by a backlight; and a control section configured to control the brightness of the backlight in the illumination section according to the viewing angle changed by the viewing angle change control section.

6. The cellular phone according to claim 1, further comprising:

a clock section configured to indicate a present time; and a viewing angle change limitation section configured to limit the execution of the viewing angle change control section according to the present time indicated by the clock section.

7. The cellular phone according to claim 1, further comprising:

a display section configured to display an image in either of two directions of the display which are orthogonal on a display side of the display device, wherein the viewing angle change control section is configured to change the viewing angle according to the direction of the displayed image.

8. A method of controlling a cellular phone comprising a CPU and a memory, and a program to execute a control process, the method comprising:

accepting a specification of one or more functions capable of being performed by the cellular phone;

changing a viewing angle of the display device according to the specification;

storing viewing angle information being associated with the one or more functions; and updating the stored viewing angle information associated with the one or more functions, wherein the act of changing the viewing angle comprises changing the viewing angle according to the updated viewing angle information, wherein at least one of the one or more functions includes a main function and a sub-function and the act of storing comprises storing the viewing angle information associated with the main function and the sub-function, and wherein when the sub-function is executed, the act of changing the viewing angle comprises determining if the viewing angle information of the sub-function is set in the stored viewing angle information, and if only the viewing angle information of the main function is set, displaying all images in the executed sub-function with the same viewing angle set for the main function, and if the viewing angle information of the sub-function is set, displaying an image for the sub-function with the viewing angle which is set for the sub-function.

* * * * *